United States Patent [19]

Araki et al.

[11] 4,406,249

[45] Sep. 27, 1983

[54] APPARATUS FOR CONTROLLING ELECTROLESS PLATING BATH

[75] Inventors: Ken Araki, Ibaragi; Hiromitsu Sakai, Kawanishi; Yutaka Sugiura, Kobe, all of Japan

[73] Assignee: C. Uyemura & Co., Ltd., Osaka, Japan

[21] Appl. No.: 352,550

[22] Filed: Feb. 26, 1982

Related U.S. Application Data

[62] Division of Ser. No. 204,046, Nov. 4, 1980, Pat. No. 4,353,933.

[30] Foreign Application Priority Data

Nov. 4, 1980 [JP] Japan ............................. 55-204046

[51] Int. Cl.³ .......................... B05D 1/40; B05D 3/12
[52] U.S. Cl. ................................................. 118/690
[58] Field of Search ................ 118/690, 429; 427/8, 427/345, 443.1

[56] References Cited

U.S. PATENT DOCUMENTS 4,096,301 7/1978 Slominski ........................... 118/690
4,152,164 5/1979 Gulla ................................... 427/345

*Primary Examiner*—Sam Silverberg

*Attorney, Agent, or Firm*—Birch, Stewart, Kolasch & Birch

[57] ABSTRACT

A method and an apparatus for controlling the content of an electroless plating bath such as an electroless nickel plating bath such that the bath is usable for an extended period of time without remaking are disclosed. The method comprises the steps of:

continuously or intermittently measuring the concentration of at least one consumable ingredient of the electroless plating bath, and automatically adding to the plating bath a first replenishing composition essentially consisting of the consumable ingredient after detecting that the measured value has reached a predetermined concentration; while continuously or intermittently measuring one physical property of the electroless plating bath to determine the degree of aging of the bath, and automatically discharging a predetermined volume of the plating solution and automatically adding to the plating bath a second replenishing composition containing unconsumable ingredients in an amount essentially corresponding to the lost amount by the discharging after detecting that the measured value has reached a predetermined value of the physical property.

4 Claims, 9 Drawing Figures

APPARATUS FOR CONTROLLING ELECTROLESS PLATING BATH

This application is a divisional of copending application Ser. No. 204,046, filed on Nov. 4, 1980 now U.S. Pat. No. 4,353,933.

BACKGROUND OF THE INVENTION

This invention relates to a method for controlling electroless plating baths such as electroless nickel plating baths and an apparatus used therefor, and more particularly, to a method for controlling electroless plating baths so that stable plating can be continuously conducted for an extended period of time and an apparatus used therefor.

Electroless plating baths are susceptible to severe variation of their composition since the metal salts, reducing agents and other ingredients are shortly consumed during plating. It is thus necessary to frequently complement such consumed ingredients to make the rate of deposition constant and the thickness and properties of deposits uniform. For such purposes, a variety of methods and apparatus for the automatic control or replenishment of electroless plating baths have been proposed as disclosed in Japanese Patent Application Laid-Open Nos. 53-44434, 53-45631 and 54-8123.

However, electroless plating baths such as electroless nickel plating baths and electroless copper plating baths have a short effective life. As electroless plating is continued for an extended period of time, reaction by-products accumulate in the plating solution. The reaction by-products, which are believed to be decomposition products of a reducing agent and neutralization salts resulting from plating reaction, adversely affect such factors as plating rate and properties of deposits. With reaction by-products accumulated, the replenishment of ingredients consumed by plating cannot prevent reduction of the plating rate and variation of the composition and properties of deposits. Accordingly, although the electroless plating solution is replenished either by the above-mentioned automatic replenishing methods or manually when needed, plating baths age or become unavailable within a relatively short period of time. The rate of deposition is remarkably reduced and the properties of the resulting deposits considerably vary as compared with those in the case of the initial plating solution, even when the metal ion and the reducing agent are replenished so as to increase their concentrations to the levels in the initial plating solution. Under such circumstances, the aged bath must be discarded and replaced by a fresh plating solution.

Even in the case where the above-mentioned automatic control of an electroless plating bath is employed to automatically replenish a plating solution, the degree of aging of the bath should always be separately monitored to accommodate such aging. Accordingly, plating baths must be discarded after a relatively short period of use in the prior art electroless plating processes combined with the above-mentioned automatic control method. The prior plating processes are also unsatisfactory with respect to bath maintenance.

SUMMARY OF THE INVENTION

It is therefore an object of the present invention to provide a method and an apparatus for controlling an electroless plating bath whereby stable continuous electroless plating can be carried out for an extended period of time with substantial elimination of the need for remaking the new electroless plating bath or at least with substantial retardation of plating bath remaking as compared with the prior art method and hence, with substantial advantages in waste disposal.

Another object of the present invention is to provide a method and an apparatus for controlling an electroless plating bath whereby the rate of deposition and the properties of deposits can be kept substantially constant and uniform for an extended period of time, and bath maintenance is easy and accurate.

A further object of the present invention is to provide an electroless plating control method and apparatus suitable in the practice of electroless plating of nickel, cobalt, nickel-cobalt alloy, copper, tin, gold, silver and the like.

According to one aspect of the present invention, there is provided a method for controlling an electroless plating bath capable of using the bath for an extended period of time without remake, the method comprising the steps of:

continuously or intermittently measuring the concentration of at least one consumable ingredient in the electroless plating bath, and automatically adding to the plating bath a first replenishing composition essentially consisting of consumable ingredients after detecting that the measured value has reached a predetermined concentration; while continuously or intermittently measuring one physical property of the electroless plating bath to determine the degree of aging of the bath, and automatically discharging a predetermined volume of the plating solution and automatically adding to the plating bath a second replenishing composition containing unconsumable ingredients in an amount essentially corresponding to the lost amount by the discharging after detecting that the measured value has reached a predetermined value of the physical property.

According to another aspect of the present invention, there is provided an apparatus for controlling an electroless plating bath capable of using an electroless plating bath for an extended period of time without remake, the apparatus comprising:

a mechanism for supplementing a first replenishing composition including:
  means for automatically measuring the concentration of at least one consumable ingredient in the electroless plating bath,
  concentration detecting means for generating a first signal when the measured value has reached a predetermined concentration, and
  means for automatically adding the first replenishing composition essentially consisting of consumable ingredients to the electroless plating bath upon receipt of the first signal, and a mechanism for discharging a predetermined volume of the electroless plating solution and supplementing a second replenishing composition including:
  means for measuring one physical property of the electroless plating bath to determine the degree of aging of the bath,
  aging degree detecting means for generating a second signal when the measured value has reached a predetermined value of the physical property,
  means for discharging a predetermined volume of the plating solution upon receipt of the second signal, and means for adding to the electroless plating bath the second replenishing composition containing unconsumable ingredients in an amount essentially corresponding to a lost amount by the discharging.

In the present invention, "consumable ingredients" designate ingredients consumed during electroless plating, e.g. a metal ion such as nickel ion and a reducing agent such as sodium hypophosphite for nickel electroless plating bath, and "unconsumable ingredients" designate ingredients not essentially consumed during electroless plating except by drug-out, e.g. a chelating agent such as sodium acetate, sodium citrate, etc.

In preferred embodiments of the present invention, the concentration of the electroless plating bath is measured in terms of the concentration of a metal in the bath, while the degree of aging of the electroless plating bath is obtained by measuring one physical property, that is, specific gravity, electrical conductivity or refractive index of the electroless plating bath.

Since the concentration of an electroless plating bath, for example, the metal concentration in the bath, is measured to determine the amount of the consumable ingredients consumed during plating and the first replenishing composition essentially consisting of the consumable ingredients is automatically replenished in accordance with the measured value, while one physical property, for example, specific gravity, electrical conductivity or refractive index of the electroless plating bath is measured to determine the degree of aging of the bath and a predetermined volume of the plating solution is discharged and the second replenishing composition containing unconsumable ingredients essentially corresponding to the discharged portion is automatically replenished each time the value of the physical property measured has reached a predetermined level (that is, each time the degree of aging has reached a predetermined value), the bath is automatically refreshed, substantially eliminating the need for remaking a plating bath or at least substantially extending the effective life of the bath as compared with the prior art method. Furthermore, since the consumable ingredients such as metal ions, reducing agents, etc. are maintained at substantially constant concentrations and the amount of reaction by-products resulting from plating process is maintained within an allowable range, the rate of deposition and the properties of the resulting deposits are maintained constant and uniform. Differently stated, the bath is maintained under highly stable conditions for an extended period of time. It is also possible to maintain the plating bath at a lower metal concentration than the prior art bath while retaining the rate of deposition at substantially the same level as the prior art. These features are also advantageous from a point of waste disposal.

The present invention may advantageously be applied to electroless plating baths of nickel, cobalt, nickel-cobalt alloy and copper.

BRIEF DESCRIPTION OF THE DRAWINGS

The above and other objects, features and advantages of the invention will become more apparent from the following description and claims taken in connection with the accompanying drawings, in which:

DETAILED DESCRIPTION OF THE PREFERRED EMBODIMENTS

Figure 1:
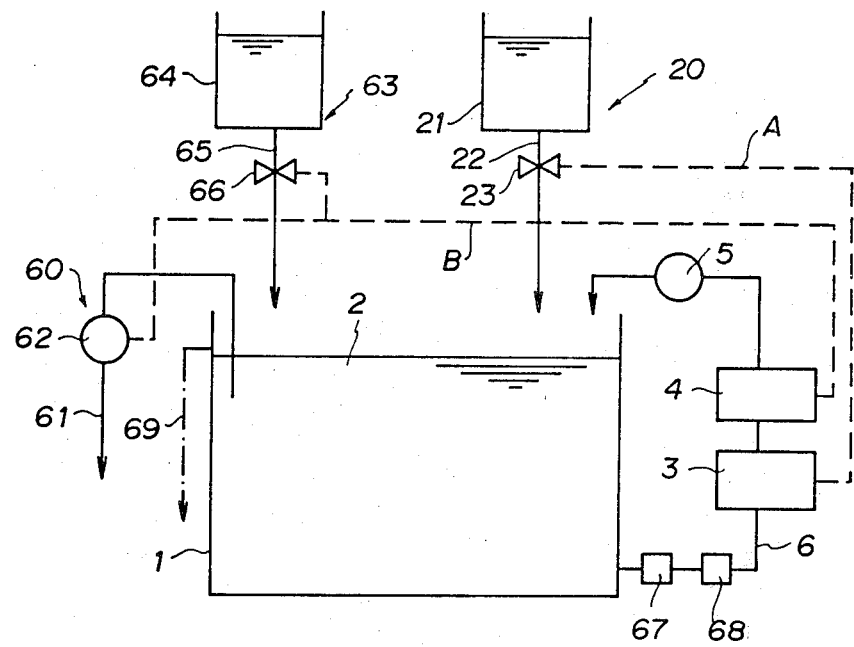
FIG. 1 is a block diagram schematically showing one embodiment of the electroless plating arrangement according to the present invention.

Referring to FIG. 1, one embodiment of the arrangement for controlling an electroless nickel plating bath according to the present invention is schematically shown as including a plating tank 1 which is provided with the necessary attachments including a heating element for heating an electroless plating bath 2 to a desired temperature, for example, a heater or steam pipe, a cooling element for cooling the bath 2 to a approximately room temperature after the completion of plating, a filter, a stirrer and the like, although they are not shown in the figure.

In connection with the plating tank 1, the arrangement includes a concentration measuring/detecting device 3 for automatically measuring the concentration of the plating bath and transmitting signal A when the measured value has reached a predetermined concentration level, a physical property measuring/detecting device 4 for measuring one physical property of the plating bath to determine the degree of aging of the plating bath and transmitting signal B when the measured value has reached a predetermined level (or predetermined degree of aging), a fluid circulating pump 5 in the form of a microtube pump, for example, and a circulating line 6 communicating the tank 1, measuring-/detecting devices 3 and 4 and the pump 5. The plating solution 2 in the tank 1 is pumped from the inlet through the line 6 to the concentration measuring/detecting device 3 where the concentration of the plating solution 2, for example the nickel concentration, is measured and then to the physical property measuring/detecting device 4 where the selected physical property of the plating solution 2 is measured before it is returned into the tank 1 from the outlet of the line 6.

Figure 2:
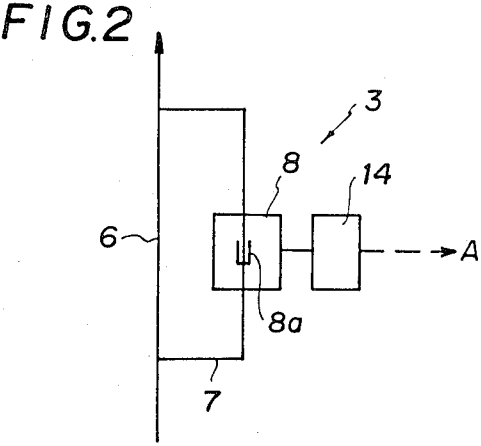
FIG. 2 is a block diagram of an example of the concentration measuring device.
Figure 3:
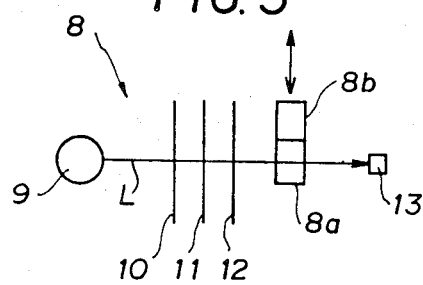
FIG. 3 is a block diagram of a spectrophotometer section of the concentration measuring device.
Figure 4:
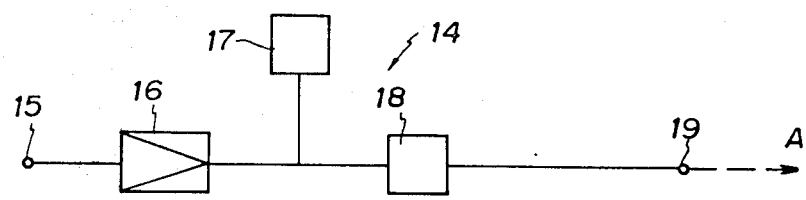
FIG. 4 is a block diagram of an example of a control section of the concentration measuring device.

FIGS. 2 to 4 illustrate an example of the concentration measuring/detecting device 3. As shown in FIG. 2, the line 6 is provided with a bypass conduit 7 which in turn, is provided with a spectrophotometer unit 8 including a flow-through cell 8a. As the plating solution 2 flows through the bypass conduit 7 and then through the flow-through cell 8a of the spectrophotometer unit 8, the optical transmittance of the solution is measured to determine the metal concentration in the solution. In this respect, it is preferable to measure the absorbance of a metal complex in the plating solution in order to follow the consumption of the metal by plating in a more sensitive manner. The transmittance of the plating solution at the absorption wave length of the metal complex is transduced into a voltage signal by means of a suitable transducer. The concentration of the plating solution 2 is monitored in this manner.

The concentration measuring/detecting device is described in detail by referring to FIGS. 3 and 4. As shown in FIG. 3, light L emitted by a light source 9 in the spectrophotometer unit 8 transmits a heat radiation absorbing filter 10, a wave length-selecting filter 11 and a condensing lens 12 in this order before it transmits to the cell 8a through which the plating solution flows continuously. The absorption of light by the plating solution is detected by a photometer 13. Another cell 8b containing the standard solution is mounted adjacent the cell 8a so that the cells may be alternately placed in the light path. The measurement cell 8a and the standard cell 8b are movable in the directions shown by an arrow. The standard cell 8b may be moved in the light path to replace the measurement cell 8a when needed, thereby measuring the absorbance of the standard solution. The spectrophotometer unit 8 is electrically connected to a control section 14. As shown in FIG. 4, a minute current flow output of the photometer 13 is fed to an input 15, amplified and converted into a voltage by an amplifier 16, and indicated by a voltmeter 17 in the form of a voltage corresponding to the absorbance. A comparator 18 compares the output of the amplifier 16 with a present voltage and produces signal A at its output 19 when the amplifier output reaches the preset value. If the preset voltage value corresponds to the absorbance at a given concentration to which the metal ion in the plating solution is consumed, then signal A developing at the output 19 represents that the metal concentration has reached the given value. Signal A is transmitted to a first replenishing mechanism 20 which consists of a reservoir 21 containing a first replenishing composition, a supply conduit 22 connected to the reservoir 21 and opening in the plating tank 1, and an electromagnetic valve 23 in the conduit 22. Upon receipt of signal A, the valve 23 is opened for a given time to allow a given amount of the first replenishing composition to flow into the plating tank 1 through the conduit 22. Thus the given amount of the first replenishing composition essentially consisting of consumable ingredients, for example, a metal salt, a reducing agent, a pH regulating agent and other consumable components is added to the electroless plating bath corresponding to the consumption. It should be noted that although the single reservoir 21 is depicted in FIG. 1, a plurality of reservoirs may be used. Each reservoir contains a different one of the consumable ingredients (e.g., a metal salt, a reducing agent, a pH regulating agent and other components). Of course, each reservoir is provided with its own conduit and electromagnetic valve.

By analysing the metal value, e.g. nickel value, in an electroless nickel plating bath, in this manner, not only the amount of the metal consumed during plating is available, but also the amount of the reducing agent consumed and the variation of pH value are available at the same time.

In the above embodiment, the absorbance of a plating solution is directly measured in order to determine metal concentrations such as nickel in the plating solution. However, the method for measuring metal concentration in the plating solution is not limited thereto, but any other suitable means may be used. For example, an indicator or other suitable reagents such as EDTA may be added to the plating solution to cause the plating solution to develop the corresponding color. The degree of color development is a measure for the metal concentration. In this case, however, those portions of the plating solution which have been subjected to concentration measurement can not be fed back to the line 6 via the bypass conduit 7 as in the case of FIG. 2. The plating solution after measurement should be separately fed to a suitable unit for waste disposal. Another example of concentration measurement is to measure the potential difference between the initial and the subsequent portions of the solution. However, the above-described method of directly measuring the absorbance of the plating solution is most advantageous among others because it can be performed by means of simple equipment and the plating solution subjected to measurement can be fed back to the plating tank 1 again. Furthermore, it is also possible to detect the varying concentration of a plating solution by measuring the varying pH value thereof. Additionally, the abovementioned nickel concentration measurement may be combined with the pH measurement so that the pH of the plating solution may be automatically and independently controlled in accordance with the value of the pH measured.

Figure 5:
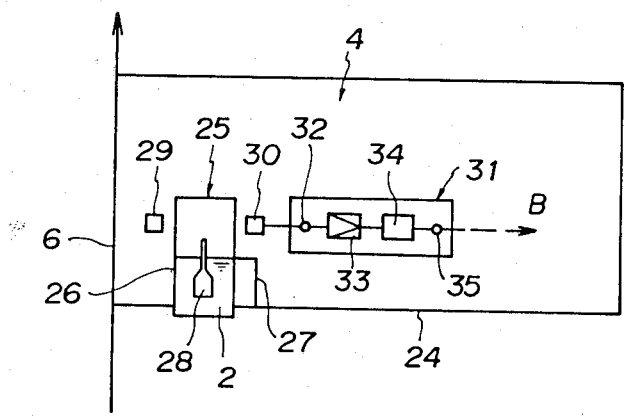
FIG. 5 is a block diagram of an example of the specific gravity measuring device.

FIG. 5 illustrates one example of the physical property measuring/detecting device 4. The line 6 is provided with a bypass conduit 24 with which a unit 25 is combined for measuring the specific gravity of the electroless plating solution. The specific gravity measuring unit 25 includes a transparent vessel 26 interposed in the bypass conduit 24 and an overflow pipe 27 such that the plating solution 2 flows into the vessel 26 through the bypass conduit 24, increases its top level, and overflows out of the vessel 26 to the downstream portion of the bypass conduit 24 through the overflow pipe 27 when the solution level exceeds the inlet of the overflow pipe 27. The level of the plating solution is thus maintained constant in the vessel 26. The vessel 26 accommodates a specific gravimeter 28 therein in the form of a hydrometer for measuring the specific gravity of the plating solution. At opposite sides of the transparent vessel 26 are located a light source 29 in the form of a light-emitting diode and a photoelectric detector 30 in the form of a photo-transistor for receiving the light emitted by the source 29. The photo detector 30 is electrically connected to a control section 31 wherein a minute current output of the photo detector 30 is fed to an input 32 and amplified and converted into a voltage by an amplifier 33. A comparator 34 compares this voltage signal with a preset voltage value which corresponds to the voltage value derived from the photo detector 30 when it receives the entire quantity of light emitted by the source 29. If the input voltage is not equal to the preset voltage value, the comparator 34 produces a signal B at its output 35.

As the plating solution 2 flows through the vessel 26, the hydrometer 28 fluctuates to a more or less extent depending on the specific gravity of the solution. When the specific gravity of the plating solution 2 is relatively low because of less aging and hence, the top of the hydrometer 28 does not reach the light path connecting the light source 29 and the photo detector 30, the photo detector 30 receives the entire quantity of light emitted by the source 29 so that signal B is not generated. As the plating solution ages, the specific gravity of the solution gradually increases and eventually exceeds the predetermined value. The hydrometer 28 rises higher and the top of the hydrometer 28 reaches the light path connecting the light source 29 and the photo detector 30. Since the light emitted by the source 29 is partially or entirely intercepted by the top of hydrometer 28, the photo detector 30 receives none or part of the emitted light. The current value transmitted to the input 32 by the detector 30 is at least reduced, and then signal B develops at the comparator output 35.

In order to measure the specific gravity of a plating solution, use may also be made of means for transducing the specific gravity of the solution into a voltage, a float or scale connected to a load cell, and the like.

Figure 6:
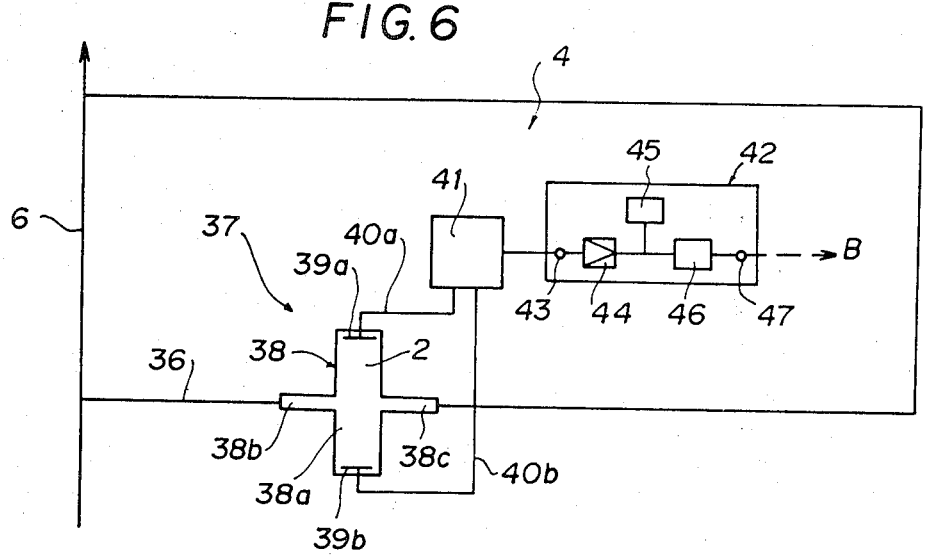
FIG. 6 is a block diagram of an example of the electrical conductivity measuring device.

FIG. 6 illustrates another example of the physical property measuring/detecting device 4. The line 6 is provided with a bypass conduit 36 having a unit 37 connected therein for measuring the electrical conductivity of the plating solution. The conductivity measuring unit 37 includes a cell 38 connected in the bypass conduit 36. The cell 38 consists of a substantially cylindrical tube 38a closed at both ends and inlet and outlet members 38b and 38c connected to opposite sides of the cylindrical tube 38a. The cylindrical tube 38a is provided in the proximity of its ends with a pair of electrodes 39a and 39b, which are made of platinum or platinum plated with platinum black, spaced apart a given distance and connected to an electrical conductivity measuring instrument 41 via leads 40a and 40b. The electrical conductivity of the plating solution 2 in the cell 38 can be determined by measuring the resistance between the electrodes 39a and 39b. In this case, the resistance between the electrodes 39a and 39b may be measured as a varying current by applying a constant voltage between them or as a varying voltage by flowing a constant current between them.

The above-mentioned conductivity detector 41 is electrically connected to a control section 42 which includes an amplifier 44, a voltmeter 45, and a comparator 46. The output of the detector 41 in the form of current or voltage is transmitted to the input 43 of the amplifier 44 where it is amplified and converted into a voltage when it is in the form of current. The thus converted voltage is indicated by the voltmeter 45 as a varying voltage corresponding to the varying conductivity and also transmitted to the comparator 46 where it is compared with a preset voltage value. The comparator 46 produces signal B at its output 47 when the measured voltage reaches the preset value.

Figure 7:
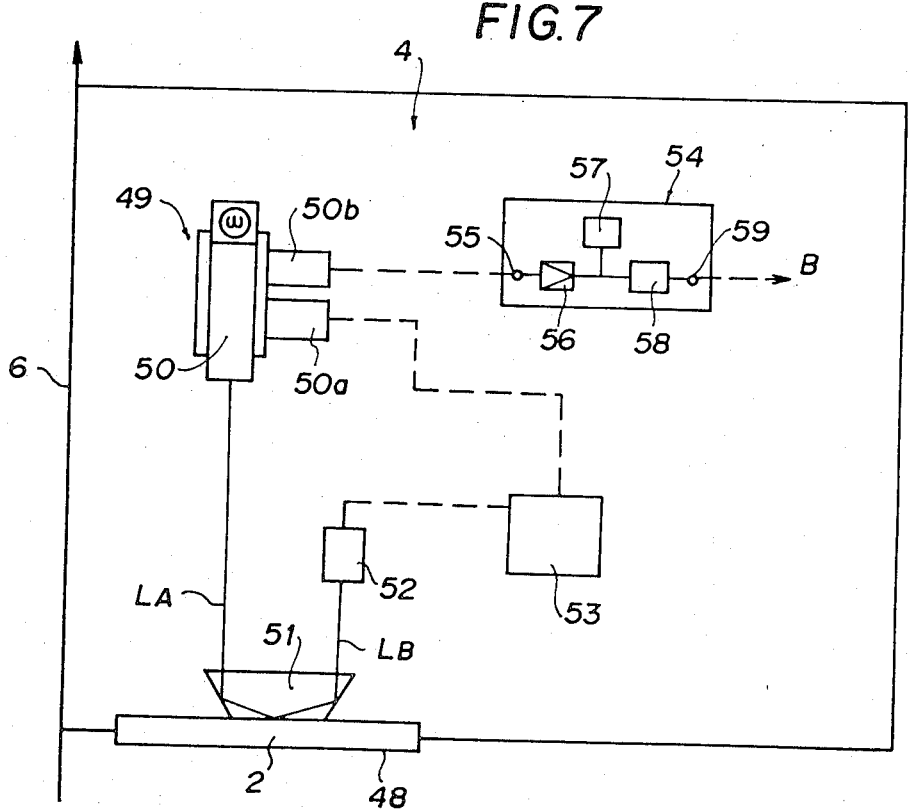
FIG. 7 is a block diagram of an example of the refractive index measuring device.

FIG. 7 illustrates a further example of the physical property measuring/detecting device 4. The line 6 is provided with a bypass conduit 48 having a unit 49 associated therewith for measuring the refractive index of the plating solution. The unit 49 is constructed such that incident light $L_A$ emitted by a light source 50 having a condenser combined therewith toward a prism 51 placed in the bypass line 48 is totally reflected at the interface between the prism 51 and the plating solution 2, and the resulting reflected light $L_B$ is received by a photometer 52. While the photometer 52 senses the critical light, i.e. the position and hence, intensity of which vary with the varying refractive index of the plating solution 2, a comparator/amplifier 53 serves to actuate a servo motor 50a to move the condenser 50 to adjust or control the angle of incident light $L_A$ so that the intensity of critical light which may otherwise vary with the varying refractive index of the plating solution is maintained constant. A variation of the angle of incident light $L_A$ is detected in the form of a potential difference by an angular detector 50b.

The angular detector 50b is electrically connected to a control section 54 which includes an amplifier 56, a voltmeter 57 and a comparator 58. The output of the detector 50b in the form of a voltage is transmitted to the input 55 of the amplifier where it is amplified. The amplified voltage is indicated by the voltmeter 57 as a voltage variation corresponding to the varying refractive index and also transmitted to the comparator 58 where it is compared with a predetermined voltage value. The comparator 58 produces signal B at its output 59 when the measured voltage reaches the predetermined value. The time when the increasing refractive index of the plating solution 2 reaches a predetermined value is the time when the potential difference corresponding to a variation of the incident light $L_A$ angle compensating for a displacement of the critical light position reaches a predetermined potential difference value.

The detection of the refractive index of the plating solution is not limited to the above-mentioned method, but it is also possible to obtain an electrical output signal by directly sensing a variation of the total quantity of the reflected light by means of a photometer or by directly sensing a displacement of the critical light as a variation of light quantity.

Referring to FIG. 1 again, numeral 60 is a discharge mechanism actuatable upon receipt of the above-mentioned signal B. This discharge mechanism 60 comprises a discharge pipe 61 having one end in fluid communication with the plating tank 1 and a control pump 62 disposed in the pipe. Upon receipt of signal B from the physical property detecting device 4, the pump 62 operates for a given time to discharge a given volume of the plating solution 2 out of the tank 1. Numeral 63 is a mechanism for supplementing a second replenishing composition containing essential ingredients which are to be lost by the discharging. The replenishing mechanism 63 comprises a reservoir 64 containing the second replenishing composition, a feed pipe 65 having one end connected to the reservoir 64, and an electromagnetic valve 66 disposed in the pipe 65. The electromagnetic valve 66, which receives signal B from the physical property detecting device 4, opens for a given time after the discharge pump 62 has been interrupted, to thereby add the second replenishing composition containing unconsumable ingredients in a volume essentially corresponding to the discharged volume into the tank 1. In this regard, the replenishing mechanism 63 may include a plurality of reservoirs each for different one of the ingredients to be replenished, each having an individual feed pipe and valve.

In FIG. 1, a cooler 67 is provided in the measuring line 6 to cool the flow of the plating solution therethrough from the tank 1 to near room temperature. Also provided in the line 6 is a filter 68 for filtering out very fine insolubles out of the flow of the plating solution therethrough. The location of the cooler 67 in the line 6 upstream of the concentration and physical property measuring/detecting devices 3 and 4 allows for measurement of concentration and physical property at room temperature because a flow of the plating solution through the bypass conduits 7 and 24, 36 or 48 has been cooled to room temperature. For the purpose of avoiding temperature dependence of these measurements, any other means may be employed as exemplified by the use of a constant-temperature bath or at temperature probe accompanied with electrical compensation.

Described below is how to control an electroless nickel plating bath using the above-constructed arrangement.

A workpiece to be plated is first subjected to well-known necessary pre-treatments in a conventional manner before electroless nickel plating is carried out by immersing the pre-treated workpiece in the plating bath 2 in the tank 1 heated at a desired temperature, for example, 90° C.

In the practice of plating in this manner, the pump 5 is operated to introduce part of the plating solution 2 from the tank 1 into the measuring line 6. The the plating solution continuously passes through the concentration and physical property measuring/detecting devices 3 and 4 where the concentration (nickel concentration in the case of the concentration measuring/detecting device 3 shown in FIG. 2) and the physical property (specific gravity, conductivity or refractive index) of the solution are automatically measured.

The progress of plating results in a reduction of the concentration of the plating solution, particularly the concentrations of nickel ion and a reducing agent (such as sodium hypohosphite) in the solution. In the event a hypophosphite is used as a reducing agent for electroless nickel plating, the plating solution also shows a reduction of pH. As a result of such concentration reduction, when the nickel concentration measured by the spectrophotometer unit 8 reaches a predetermined concentration value in the case of the concentration measuring/detecting device 3 shown in FIG. 2, the control section 14 associated with the detecting device 3 produces signal A. Detailedly, prior to measurement of the absorbance of the actual plating solution, the standard solution cell 8b is moved in the light path to replace the cell 8a. The absorbance of nickel in the standard solution in the cell 8b is measured and the thus obtained absorbance value is set in the comparator 18 as a reference value. Then the flow-through cell 8a is moved in the light path. When the nickel concentration of the solution which is given in terms of the absorbance of the plating solution measured by the spectrophotometer unit 8 reaches the predetermined concentration value or when the voltage detected reduces to or below the preset reference value, the comparator 18 transmits signal A to the electromagnetic valve 23 of the first replenishing mechanism 20 to open the valve 23 for a given time. Accordingly, a given amount of the first replenishing composition is fed from the reservoir 21 to the tank 1 to compensate for those ingredients consumed during the preceding plating such as nickel ion and reducing agent and to adjust the pH of the plating bath 2. It should be noted that the first replenishing composition mainly contains those ingredients consumable during plating including nickel salt, reducing agent and pH regulating agent such as sodium hydroxide and optionally, a minor amount of complexing agent, stabilizer, brightener, etc. It is generally desired to keep the nickel salt, reducing agent and pH regulating agent separate from each other. In such separate storage, each optional agent such as complexing agent, stabilizer, and brightener may preferably be mixed with the basic ingredient to which it is inert.

By adding the first replenishing composition in this manner, the concentration of the plating bath 2 (the concentrations of nickel, reducing agent, etc.) is restored to the initial level so that the rate of plating or deposition is maintained substantially constant.

As reaction by-products accumulate in the plating bath 2, the values of physical properties such as specific gravity, conductivity and refractive index of the plating solution vary. It is therefore possible to determine the degree of aging of the plating bath by measuring one physical property, for example, specific gravity, conductivity or refractive index of the bath. The specific gravity, conductivity and refractive index of the solution can be measured by the devices shown in FIGS. 5, 6 and 7, respectively, as described above. When the measured value reaches a predetermined degree of aging (predetermined specific gravity, conductivity or refractive index value), the physical property detecting device 4, more specifically, the associated control section 31, 42 or 54 transmits signal B to the discharge mechanism 60. Upon receipt of signal B, the pump 62 is operated for a given time to discharge a given volume of the plating solution from the tank 1 through the discharge pipe 61. It should be noted that the discharge liquid is desirably fed to a waste treatment device and essential ingredients contained therein may be circulated for reuse after the undesired by-products are removed. Upon interruption of the pump 62, the electromagnetic valve 66 of the second replenishing mechanism 63 is opened for a given time to supply a given volume of the second replenishing composition from the reservoir 64 to the tank 1. It should be noted that this second replenishing composition makes up for those ingredients to be lost by discharging and mainly contains a complexing agent. Generally, use may be made of a solution having the same composition as the initially made-up plating bath or its concentrate or those solutions mainly containing a complexing agent which is scarcely consumed by plating. If ingredients to be replenished such as metal salt and reducing agent tend to react with each other, it is preferred that they are separately stored in different reservoirs.

The discharging of a given volume of the plating solution and the replenishing of an essentially corresponding volume of the second replenishing composition prevent reaction by-products from accumulating in the plating bath to an undesired extent, thereby controlling the amount of such reaction by-products within an allowable range. As a result, reduction of plating rate due to accumulation of reaction by-products is precluded. The plating bath is intermittently renewed in the continued operation for an extended period of time. For an extended operation of the plating bath, the plating rate is maintained substantially constant and deposits are maintained substantially uniform in every respect including the composition and properties, for example, Ni-P alloy composition for a hypophosphite reducing agent and the hardness of deposits. With respect to this matter, the inventors have found that the accumulation of reaction by-products or the degree of aging of plating bath can be accurately monitored by following the specific gravity, conductivity or refractive index of the plating bath. When the degree of aging of the plating bath reaches a predetermined value or above, a part of the plating bath is discharged and a replenishing composition mainly containing ingredients to be lost by the discharging is replenished. As a result, the amount of reaction by-products is maintained substantially constant in the plating bath so that the bath is effective semi-permanently or at least the effective life thereof is remarkably extended as compared with prior art plating methods. For such extended use of plating baths, the plating rate, quality of deposits and other factors are maintained substantially uniform.

According to the above-mentioned plating process, the plating bath is automatically controlled and maintained in an easy, but accurate manner. Especially important is the ease of maintenance of electroless plating baths which are notoriously troublesome to handle as compared with usual electroplating. Furthermore, since the plating bath is always maintained at a substantially constant concentration by the replenishment, the nickel concentration of the bath may be set lower at the beginning unlike the prior art which needs to set the initial nickel concentration to a higher level in order to compensate for a reduction of plating or deposition rate due to reduction of nickel concentration in the progress of plating. In addition, the plating bath is automatically renewed little by little by means of the discharging and replenishing mechanisms 60 and 63, minimizing the burden of waste treatment.

In the above-mentioned embodiments, the concentration measuring device is incorporated in the bypass conduit, but it may be directly incorporated in the circulating line with omission of a bypass conduit. Also, the concentration measuring device may be provided within the plating tank.

Although the physical property measuring devices are incorporated in the bypass conduit to mesure the physical properties of the plating bath such as specific gravity, conductivity and refractive index in the above embodiments, they may be directly incorporated in the circulating line with omission of a bypass conduit. Although the concentration measurement is followed by the physical property measurement in the above embodiments, the order of measurements is not limited thereto, but may be reversed. Alternatively, concentration and physical property may be measured in different independent circuits. The physical property measuring device may also be provided in the plating tank.

In the above-mentioned embodiments, the second replenishing mechanism 63 acts after the discharge pump 62 of the discharge mechanism 60 has been interrupted. Alternatively, the replenishing mechanism 63 may act by the command of signal B when or before the discharge pump 62 operates. The first and second replenishing mechanism 20 and 63 are not limited to the above-mentioned embodiments. For example, a dispensing pump may be used for the supplement of the first or second replenishing composition.

The discharge mechanism 60 may be replaced by an overflow pipe 69 as depicted by a dot-and-dash line in FIG. 1. In this case, signal B is transmitted from the control section 14 to the second replenishing mechanism 63 to feed a given volume of the second replenishing composition to the plating bath in the tank 1. An incremental volume of the plating solution due to the addition of the second replenishing composition is discharged through the overflow pipe 69.

Although the above embodiments refer to the control of electroless nickel plating, similar results may be obtained for other electroless plating including electroless cobalt plating and electroless cobalt-nickel plating as well as electroless coppper plating using a formalin or hypophosphite reducing agent.

Other modifications and variations may be made within the scope and spirit of the invention.

The invention will be understood more readily with reference to the following examples, which are not to be construed to limit the scope of the invention.

EXAMPLE 1

Plating was conducted in 100 liters of an electroless nickel plating bath having the following composition and physical and chemical data:

| | |
|---|---|
| Nickel sulfate (NiSO$_4$.6H$_2$O) | 18 g/l |
| (nickel ion | 4 g/l) |
| Sodium hypophosphite (NaH$_2$PO$_2$.H$_2$O) | 24 g/l |
| Sodium succinate | 16 g/l |
| Malic acid | 18 g/l |
| Stabilizer (Pb$^{2+}$) | 0.003 g/l |
| pH | 5.6 |
| Specific gravity, 25° C. | 1.051 |
| Electrical conductivity, 25° C. | 36 m.mho/cm |
| Refractive index, 25° C. | 7.4 Brix % | at a temperature of 90° C. in an apparatus as shown in FIGS. 1 to 5 while the nickel concentration and specific gravity of the bath were automatically and continuously measured (the nickel concentration measurement was effected by measuring the transmittance at 670 nm). It was assumed that the set level of nickel ion was 4 g/l. At the time the nickel concentration measured had decreased to the set level (4%) or below, signal A was generated to add a first replenishing composition consisting of the below-mentioned three replenishing solutions I, II and III in equal amounts of 400 ml (equivalent to 0.2 g/l of Ni$^{2+}$) for each addition. These replenishing solutions I, II and III were contained in three separate reservoirs each provided with a feed conduit and an electromagnetic valve. In response to signal A, the valves were simultaneously opened for a given time to feed equal amounts of the respective replenishing solutions to the plating bath. It was also assumed that the set specific gravity was 1.221. When the specific gravity measured had increased to the set level (1.211) or higher, signal B was generated to discharge 5 liters of the plating solution each time before 5 liters of a second replenishing composition consisting of the solution IV having the following composition was fed. (the invention method)

For the purpose of comparison, the above-mentioned plating procedure was repeated except that the specific gravity measurement was not effected, and hence, neither the discharge of the plating solution nor the replenishment of the second replenishing solution IV was conducted. That is, only the nickel concentration was measured and the solutions I, II and III were added accordingly. (comparative method).

After plating was conducted a given number of turns (by "one turn" is meant the consumption of 4 g of nickel ion per liter of plating bath in continuous plating, and hence an increased number of turns results in further aging of the bath), the rate of deposition and the composition of Ni-P alloy deposit were determined, obtaining the results shown in Table 1.

| The first replenishing composition | |
|---|---|
| Replenishing solution I | |
| Nickel sulfate | 225 g/l |
| Stabilizer (Pb$^{2+}$) | 0.075 g/l |
| Replenishing solution II | |
| Sodium hypophosphite | 270 g/l |
| Replenishing solution III | |
| Sodium hydroxide | 68 g/l |
| The second replenishing solution (composition) IV: the same composition as the initial plating solution | |
| Sodium succinate | 16 g/l |
| Malic acid | 18 g/l |
| Nickel sulfate | 18 g/l |
| Sodium hypophosphite | 24 g/l |
| Stabilizer (Pb$^{2+}$) | 0.003 g/l |

TABLE 1

| Number of turns | Rate of deposition (μm/hour) Invention | Rate of deposition (μm/hour) Comparative | P content in Ni—P deposit (%) Invention | P content in Ni—P deposit (%) Comparative |
| --- | --- | --- | --- | --- |
| 2 | 20.0 | 20.0 | 7.8 | 7.8 |
| 4 | 20.0 | 17.0 | 8.2 | 8.4 |
| 6 | 20.0 | 13.5 | 8.2 | 9.2 |
| 8 | 19.8 | 10.0 | 8.2 | 9.8 |
| 10 | 19.8 | 8.5 | 8.2 | 10.4 |
| 12 | 19.8 | unplated | 8.2 | — |
| 14 | 19.6 | | 8.2 | |
| 16 | 19.6 | | 8.2 | |
| 18 | 19.4 | | 8.2 | |
| 20 | 19.4 | | 8.3 | |
| 22 | 19.2 | | 8.3 | |
| 24 | 19.0 | | 8.3 | |
| 26 | 18.8 | | 8.3 | |
| 28 | 18.8 | | 8.3 | |
| 30 | 18.8 | | 8.3 | |
| 32 | 18.6 | | 8.3 | |
| 34 | 18.6 | | 8.3 | |
| 36 | 18.4 | | 8.3 | |
| 38 | 18.2 | | 8.4 | |
| 40 | 18.0 | | 8.4 | |

EXAMPLE 2

Plating was conducted in an electroless cobalt plating bath having the following composition and physical and chemical data:

| | |
| --- | --- |
| Cobalt sulfate ($CoSO_4.7H_2O$) | 22.5 g/l |
| Sodium hypophosphite ($NaH_2PO_2.H_2O$) | 22.5 g/l |
| Sodium tartrate | 115.0 g/l |
| Boric acid | 8.4 g/l |
| Thiourea | 0.01 g/l |
| pH | 9.0 |
| Specific gravity, 25° C. | 1.036 |
| Electrical conductivity, 25° C. | 26 m.mho/cm |
| Refractive index, 25° C. | 5.3 Brix % | at a temperature of 90° C. in an apparatus as shown in FIGS. 1 to 5 while the cobalt concentration and specific gravity of the bath were automatically and continuously measured. It was assumed that the set level of cobalt ion was 4 g/l. At the time the cobalt concentration measured had decreased to the set level (4 g/l) or below, signal A was generated to add a first replenishing composition consisting of the below-mentioned three replenishing solutions, V, VI and VII in equal amounts of 2 ml per liter of the bath for each addition. These replenishing solutions V, VI and VII were contained in three separate reservoirs each provided with a feed conduit and an electromagnetic valve. In response to signal A, the valves were simultaneously opened for a given time to feed equal amounts of the respective solutions V, VI and VII to the plating bath. It was also assumed that the set specific gravity was 1.125. At the time the specific gravity measured had increased to the set level (1.125) or higher, signal B was transmitted to discharge 10–50 ml/l of the plating bath each time before the corresponding amount of a second replenishing composition consisting of the solution VIII having the following composition was fed. (the invention method)

For the purpose of comparison, the above-mentioned plating procedure was repeated except that the specific gravity measurement was not effected, and hence, neither discharge of the plating solution nor replenishment of the second replenishing solution VIII was conducted. That is, only the cobalt concentration was measured and the solutions V, VI and VII were added accordingly. (comparative method)

After plating was conducted a given number of turns (by "one turn" is meant the consumption of 4 g of cobalt ion per liter of plating bath in continuous plating), the rate of deposition and the composition of Co-P alloy deposit were determined, obtaining the results shown in Table 2.

| The first replenishing composition | |
| --- | --- |
| Replenishing solution V | |
| Cobalt sulfate | 240 g/l |
| Thiourea | 0.11 g/l |
| Replenishing solution VI | |
| Sodium hypophosphite | 270 g/l |
| Replenishing solution VII | |
| Sodium hydroxide | 68 g/l |
| The second replenishing solution VIII | |
| sodium tartrate | 115 g/l |
| Boric acid | 8.4 g/l |

TABLE 2

| Number of turns | Rate of deposition (μm/hour) Invention | Rate of deposition (μm/hour) Comparative | P content in Co—P deposit (% by weight) Invention | P content in Co—P deposit (% by weight) Comparative |
| --- | --- | --- | --- | --- |
| 1 | 14.7 | 14.5 | 4.7 | 4.3 |
| 2 | 14.6 | 14.0 | 4.7 | 4.4 |
| 3 | 14.0 | 13.3 | 4.8 | 4.8 |
| 4 | 14.0 | 12.8 | 4.8 | 5.2 |
| 5 | 13.7 | 11.1 | — | 5.7 |
| 6 | 13.4 | 9.1 | 5.0 | 5.8 |
| 7 | 13.0 | 6.3 | — | 6.4 |
| 8 | 12.8 | unplated | 5.4 | — |
| 9 | 12.7 | | — | |
| 10 | 12.2 | | 5.4 | |
| 11 | 12.1 | | — | |
| 12 | 11.9 | | 5.5 | |
| 13 | 11.5 | | — | |
| 14 | 11.2 | | 5.8 | |
| 15 | 11.0 | | — | |
| 16 | 10.7 | | 5.9 | |

EXAMPLE 3

Using 100 liters of the same electroless nickel plating bath as in Example 1 and an apparatus as shown in FIGS. 1 to 4 and 6, the general procedure of Example 1 was repeated except that the electrical conductivity of the bath was measured instead of specific gravity. In this example, the set conductivity was assumed to be 50 millimho (m. ℧) per centimeter (hereinafter referred to as m.mho/cm). Signal B was transmitted at the time the conductivity measured had increased to the set level (50 m.mho/cm) or higher.

The results obtained are shown in Table 3 together with the results of a comparative plating procedure without conductivity monitoring.

TABLE 3

| Number of turns | Rate of deposition (μm/hour) Invention | Rate of deposition (μm/hour) Comparative | P content in Ni—P deposit (% by weight) Invention | P content in Ni—P deposit (% by weight) Comparative |
| --- | --- | --- | --- | --- |
| 1 | 20.6 | 20.0 | 7.8 | 7.8 |
| 4 | 20.0 | 17.0 | 8.0 | 8.4 |
| 6 | 19.8 | 13.5 | 8.0 | 9.2 |
| 8 | 19.8 | 10.0 | 8.0 | 9.8 |
| 10 | 19.8 | 8.5 | 8.0 | 10.4 |
| 12 | 19.6 | unplated | 8.0 | — |
| 14 | 19.6 | | 8.1 | |
| 16 | 19.6 | | 8.1 | |

TABLE 3-continued

| Number of turns | Rate of deposition (μm/hour) | | P content in Ni—P deposit (% by weight) | |
|---|---|---|---|---|
| | Invention | Comparative | Invention | Comparative |
| 18 | 19.6 | | 8.1 | |
| 20 | 19.4 | | 8.1 | |
| 22 | 19.4 | | 8.2 | |
| 24 | 19.2 | | 8.2 | |
| 26 | 19.2 | | 8.2 | |
| 28 | 19.2 | | 8.2 | |
| 30 | 19.0 | | 8.2 | |
| 32 | 19.0 | | 8.2 | |
| 34 | 19.0 | | 8.2 | |
| 36 | 18.8 | | 8.2 | |
| 38 | 18.8 | | 8.2 | |
| 40 | 18.6 | | 8.3 | |

Figure 8:
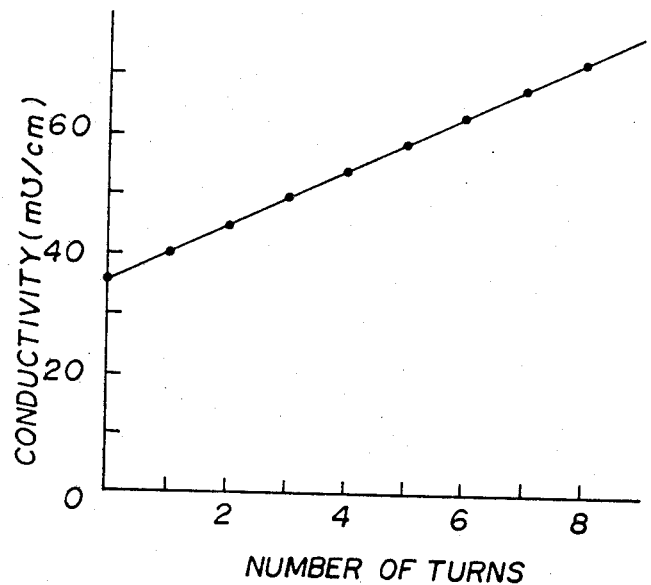
FIG. 8 graphically illustrates the relationship of the number of turns to the electrical conductivity of an electroless plating bath.

FIG. 8 graphically illustrates the relationship of the number of turns to the electrical conductivity (m.mho/cm) of the electroless nickel plating bath having the above-described composition (measurement temperature 25° C.). The results of FIG. 8 reveal that the conductivity increases linearly as the number of turns and hence, the degree of aging of the electroless nickel plating bath increases. This proves that the degree of aging of a plating bath can be accurately monitored through measurement of the conductivity thereof.

EXAMPLE 4

Using the same electroless cobalt plating bath as in Example 2 and an apparatus as shown in FIGS. 1 to 4 and 6, the general procedure of Example 2 was repeated except that the electrical conductivity of the bath was measured instead of specific gravity. In this example, the set conductivity was assumed to be 35 m.mho/cm. Signal B was transmitted at the time the conductivity measured increased to the set level (35 m.mho/cm) or higher.

The results obtained are shown in Table 4 together with the results of a comparative plating procedure without conductivity monitoring.

TABLE 4

| Number of turns | Rate of deposition (μm/hour) | | P content in Co—P deposit (% by weight) | |
|---|---|---|---|---|
| | Invention | Comparative | Invention | Comparative |
| 1 | 14.6 | 14.5 | 4.4 | 4.3 |
| 2 | 14.4 | 14.0 | 4.5 | 4.4 |
| 3 | 14.4 | 13.3 | 4.7 | 4.8 |
| 4 | 14.0 | 12.8 | 4.8 | 5.2 |
| 5 | 13.8 | 11.1 | 4.9 | 5.7 |
| 6 | 13.6 | 9.1 | 5.1 | 5.8 |
| 7 | 13.2 | 6.3 | 5.1 | 6.4 |
| 8 | 13.2 | unplated | 5.2 | — |
| 9 | 13.0 | | 5.2 | |
| 10 | 12.6 | | 5.4 | |
| 11 | 12.4 | | 5.5 | |
| 12 | 12.4 | | 5.6 | |
| 13 | 12.0 | | 5.6 | |
| 14 | 11.6 | | 5.7 | |
| 15 | 11.4 | | 5.7 | |
| 16 | 11.4 | | 5.8 | |

EXAMPLE 5

Using 100 liters of the same electroless nickel plating bath as in Example 1 and an apparatus as shown in FIGS. 1 to 4 and 7, the general procedure of Example 1 was repeated except that the refractive index of the bath was measured instead of specific gravity. In this example, the set refractive index was assumed to be 16.0 Brix %. Signal B was transmitted at the time the refractive index measured increased to the set level (16.0 Brix %) or higher.

The results obtained are shown in Table 5 together with the results of a comparative plating procedure without refractive index monitoring.

TABLE 5

| Number of turns | Rate of deposition (μm/hour) | | P content in Ni—P deposit (% by weight) | |
|---|---|---|---|---|
| | Invention | Comparative | Invention | Comparative |
| 2 | 20.5 | 20.0 | 7.8 | 7.8 |
| 4 | 20.0 | 17.0 | 8.0 | 8.4 |
| 6 | 19.8 | 13.5 | 8.0 | 9.2 |
| 8 | 19.8 | 10.0 | 7.9 | 9.8 |
| 10 | 19.6 | 8.5 | 7.9 | 10.4 |
| 12 | 19.6 | unplated | 7.9 | — |
| 14 | 19.4 | | 7.9 | |
| 16 | 19.4 | | 7.9 | |
| 18 | 19.4 | | 7.9 | |
| 20 | 19.2 | | 7.8 | |
| 22 | 19.2 | | 7.8 | |
| 24 | 19.0 | | 7.8 | |
| 26 | 19.0 | | 7.8 | |
| 28 | 18.8 | | 7.8 | |
| 30 | 18.6 | | 7.7 | |
| 32 | 18.4 | | 7.7 | |
| 34 | 18.4 | | 7.7 | |
| 36 | 18.2 | | 7.7 | |
| 38 | 18.0 | | 7.6 | |
| 40 | 17.6 | | 7.6 | |

Figure 9:
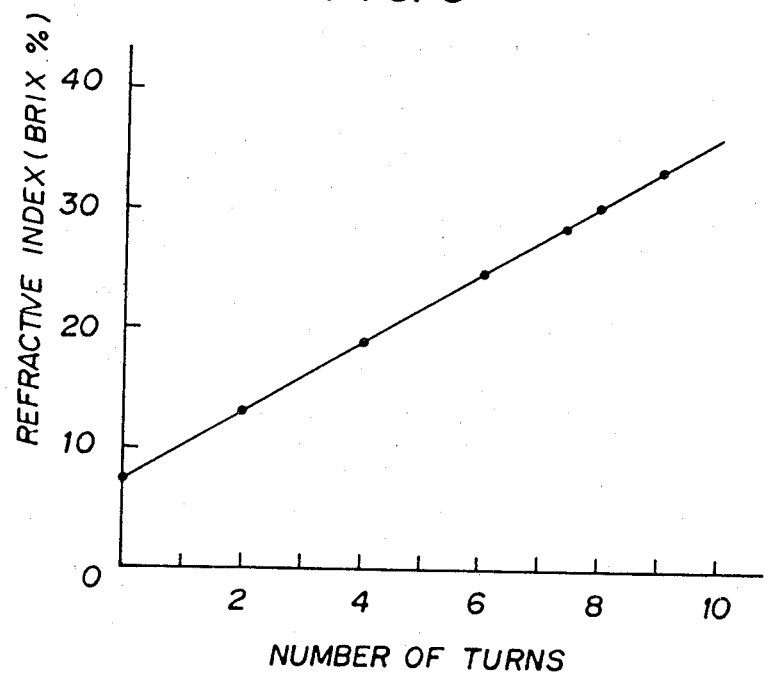
FIG. 9 graphically illustrates the relationship of the number of turns to the refractive index of an electroless plating bath.

FIG. 9 graphically illustrates the relationship of the number of turns to the refractive index (Brix %) of the electroless nickel plating bath having the abovedescribed composition (measurement temperature 25° C.). It is seen from FIG. 9 that the refractive index increases linearly as the number of turns and hence, the degree of aging of the electroless nickel plating bath increases. This proves that the degree of aging of a plating bath can be accurately monitored through measurement of the refractive index thereof.

EXAMPLE 6

Using the same electroless cobalt plating bath as in Example 2 and an apparatus as shown in FIGS. 1 to 4 and 7, the general procedure of Example 2 was repeated except that the refractive index of the bath was measured instead of specific gravity. In this example, the set refractive index was assumed to be 11.5 Brix %. Signal B was transmitted at the time the refractive index measured increased to the set level (11.5 Brix %) or higher.

The results obtained are shown in Table 6 together with the results of a comparative plating procedure without refractive index monitoring.

TABLE 6

| Number of turns | Rate of deposition (μm/hour) | | P content in Co—P deposit (% by weight) | |
|---|---|---|---|---|
| | Invention | Comparative | Invention | Comparative |
| 1 | 14.6 | 14.5 | 4.4 | 4.3 |
| 2 | 14.3 | 14.0 | 4.5 | 4.4 |
| 3 | 14.0 | 13.3 | 4.7 | 4.8 |
| 4 | 13.6 | 12.8 | 4.8 | 5.2 |
| 5 | 13.4 | 11.1 | 4.8 | 5.7 |
| 6 | 13.0 | 9.1 | 4.9 | 5.8 |
| 7 | 12.4 | 6.3 | 4.9 | 6.4 |
| 8 | 12.4 | unplated | 5.0 | — |
| 9 | 12.2 | | 5.0 | |
| 10 | 11.6 | | 5.1 | |
| 11 | 11.4 | | 5.2 | |
| 12 | 11.0 | | 5.2 | |

TABLE 6-continued

| Number of turns | Rate of deposition (μm/hour) | | P content in Co—P deposit (% by weight) | |
| --- | --- | --- | --- | --- |
| | Invention | Comparative | Invention | Comparative |
| 13 | 11.0 | | 5.3 | |
| 14 | 10.6 | | 5.3 | |
| 15 | 10.2 | | 5.5 | |
| 16 | 9.6 | | 5.5 | |

As seen from the results of Tables 1 to 6, the present invention is advantageous in that the effective life of an electroless plating bath is substantially extended as compared with prior art methods. Furthermore, the rate of deposition and the physical properties of deposits are substantially uniform and consistent, and plating baths can be maintained highly stable for an extended period of time since metallic value, reducing agent and other ingredients are maintained at substantially constant concentrations and the amount of reaction by-products resulting from plating process is maintained within an allowable range.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An apparatus for controlling the content of an electroless plating bath such that the bath is capable of being used for an extended period of time without being remade, the bath consisting of consumable ingredients including a metal ion and a reducing agent and unconsumable ingredients including a complexing agent, the metal ion being reduced to a metal by the reducing agent, whereby reaction by-products including decomposition products of the reducing agent are produced, said apparatus comprising in combination:

a mechanism for supplementing a first replenishing composition to said bath including;

means for automatically measuring the concentration of at least one consumable ingredient in the solution of said electroless plating bath, concentration detecting means for generating a first signal when the measured value has been reduced to a predetermined concentration, and means for automatically adding the first replenishing composition consisting essentially of consumable ingredients to said electroless plating bath upon receipt of said first signal, and a mechanism for discharging a predetermined volume of said electroless plating bath solution and supplementing said bath with a second replenishing composition including;

means for measuring the specific gravity of the electroless plating bath to determine the degree of aging of the bath, means for detecting the degree of aging of said bath which generates a second signal when said measured value has reached a predetermined value of said specific gravity, means for discharging a predetermined volume of said plating solution upon receipt of said second signal, and means for adding to said electroless plating bath said second replenishing composition containing unconsumable ingredients therein in an amount essentially corresponding to the amount discharged.

2. The apparatus as set forth in claim 1 wherein said concentration measuring means is designed so as to determine the light absorbance of a metal complex in said electroless plating bath.

3. The apparatus of claim 1 wherein the reducing agent present in said electroless bath comprises a hypophosphite salt.

4. The apparatus of claim 1 wherein said electroless plating bath is selected from at least one of an electroless nickel plating bath, an electroless cobalt plating bath, an electroless nickel-cobalt alloy plating bath and an electroless copper plating bath.

* * * * *

UNITED STATES PATENT AND TRADEMARK OFFICE
CERTIFICATE OF CORRECTION

PATENT NO. : 4,406,249
DATED : September 27, 1983
INVENTOR(S) : K. ARAKI et al

It is certified that error appears in the above–identified patent and that said Letters Patent are hereby corrected as shown below:

In the category "[30] Foreign Application Priority Data"

change "Nov. 4, 1980 [JP] Japan...............55-204046" to

--Nov. 14, 1979 [JP] Japan................54-147215

Dec. 22, 1979 [JP] Japan................54-167333

Dec. 22, 1979 [JP] Japan................54-167334--

Signed and Sealed this

Twenty-fifth Day of December 1984

[SEAL]

Attest:

Attesting Officer

GERALD J. MOSSINGHOFF

*Commissioner of Patents and Trademarks*